United States Patent [19]

Kleinman

[11] Patent Number: 4,974,174

[45] Date of Patent: Nov. 27, 1990

[54] ALIGNMENT METHOD FOR POSITIONING TEXTUAL AND GRAPHIC OBJECTS

[75] Inventor: Barry S. Kleinman, Tewksbury, Mass.

[73] Assignee: Wang Laboratories, Inc., Lowell, Mass.

[21] Appl. No.: 399,418

[22] Filed: Aug. 23, 1989

Related U.S. Application Data

[63] Continuation of Ser. No. 88,927, Aug. 24, 1987, abandoned.

[51] Int. Cl.⁵ .............................................. G06F 15/62
[52] U.S. Cl. ...................................... 364/521; 364/518
[58] Field of Search ................ 364/518, 521; 340/724, 340/730, 731

[56] References Cited

U.S. PATENT DOCUMENTS

| | | | |
|---|---|---|---|
| 3,712,443 | 1/1973 | Mathews | 340/724 X |
| 4,195,338 | 3/1980 | Freeman | 340/724 X |
| 4,606,664 | 8/1986 | Pascoe | 340/724 X |
| 4,675,830 | 6/1987 | Hawkins | 340/731 |
| 4,858,150 | 8/1989 | Aizawa et al. | 340/724 X |

Primary Examiner—Dale M. Shaw
Assistant Examiner—Mark K. Zimmerman
Attorney, Agent, or Firm—Michael H. Shanahan; Scott K. Peterson

[57] ABSTRACT

In a computer system, an application program is able to specify the location of an object to be displayed relative to another object to be displayed by means of alignment points selected for each of the objects. The alignments points include the intersections of vertical lines through the left and right edges and center of an object and horizontal lines through top and bottom edges, center and baseline of a first line of text. An offset between the selected alignment points may be specified. The alignment points are defined independent of the content of the objects, and the operating system, in displaying the contents of each object, positions the object as specified by the alignments points and offset. Where an object is aligned relative to two anchor objects, the operating system may adjust the size of the aligned object.

24 Claims, 2 Drawing Sheets

ALIGNMENT METHOD FOR POSITIONING TEXTUAL AND GRAPHIC OBJECTS

This is a continuation of co-pending application Ser. No. 07/088,927 filed on Aug. 24, 1987 now abandoned.

FIELD OF THE INVENTION

This invention is related to computer displays, and more particularly to display systems capable of providing a display to a user composed of a plurality of subsections of varying size and shape.

BACKGROUND OF THE INVENTION

Most computer systems use a display terminal as the primary method of interacting with the user. Information is given to the user by displaying alphanumeric or graphical data to the user on the display terminal. Typically, the display is controlled by the operating system, and applications programs provide a display by transferring data to the operating system which in turn sends this information to the display.

Early display terminals were generally directed toward displaying alphanumeric information. Such terminals would typically have a fixed number of rows, each row containing a plurality of columns. Each row and column location is a fixed size and displays one character. Limited graphical displays may be achieved on such terminals by including a plurality of graphic characters in addition to the standard ASCII alphanumeric character set. Since each character on this type of display is a fixed size, it is easy to determine where, on a display, a particular character will be located.

Recently, however, bit mapped displays have become more widely used as the cost of such displays decreases and new applications programs demand greater performance from the display terminal. Many word processing programs have the capability to display text using multiple fonts, including differently-sized fonts and proportionally spaced fonts. The support of such fonts by operating systems is also becoming more common. When using these fonts, determining the position of an individual character becomes much more complicated. The location depends upon the prior characters displayed and their individual widths.

Another factor affecting the display of information is the increasing complexity of operating systems, particularly operating systems which support multiple users or multiple tasks. Newer operating systems tend to require display data to be formatted as a logical description of the information to be displayed rather than as a physical specification of the actual data which must be sent to the display to provide a desired display. For example, to display a rectangle, an operating system may require coordinates corresponding to two opposite corners of the rectangle, as opposed to a sequence of coordinates defining each of the display locations to be turned on to display the rectangle. This type of approach has two principle advantages. First, it isolates applications programs from the physical characteristics and limitation of the particular display device being used. Thus, a request for a rectangle would automatically be converted by the operating system to a series of bits corresponding to the rectangle size to be displayed on a bit-mapped display, while the same request would be converted to a number of graphical characters representing the sides and corners of the rectangle for display on a character-oriented display. Second, with this method of operation, much of the display code is contained within the operating system which allows for optimization of the code and avoids duplication of code in multi tasking systems.

In presenting multi-part displays to a user, an operating system frequently receives information specifying a series of graphic and/or textual display parts having a specified orientation. For example, in response to a command, the operating system may be required to display a question which is presented to the user and which is followed by the user s response as it is typed. Another example is the use of multiple menus and menu bars for the selection of different parameters during the operation of a program.

There are several approaches to displaying information of the above described type which are currently used. One method is X/Y positioning, in which the origin (such as the upper left corner) of each character or graphic object is specified by a coordinate pair. The coordinate pair is converted to screen coordinates by a mapping function. This may be a one to one relationship of integer coordinates to pixels or may include scaling up or down of a display to optimally utilize a particular display device. This method has the disadvantage of all numerical coordinate systems in that the size of objects must be known before their positions in a group can be specified, which can present difficulty if proportionally spaced text is supported by the computer system.

An improvement on the X/Y positioning method is space/leading positioning. In this method, the objects are organized into an array. The vertical distance between rows of the array is a constant value called the leading. The objects within the rows are concatenated. Horizontal positioning is accomplished by inserting text objects consisting of space characters in the rows. This method has advantages over X/Y positioning when used with proportionally spaced fonts, since the leading and width of the space character may be easily changed as the fonts are changed. This method has the disadvantage that it is not very flexible and is only useful for arrays, or rows and columns, of objects. Thus, menus and dialogue boxes, which are becoming more popular, are not easily accommodated with a space/leading positioning technique.

An improvement on space/leading involves the addition of tabbing functions. This is similar to space/leading positioning except that tabbing characters or escape sequences can be used in text strings to specify, for example, alignment of subsequent objects, rather than mere concatenation. This technique is more flexible than space/leading positioning alone, but results in more complicated object descriptions. For example, to get a line with "middle" centered and "end" right-aligned, a program might send a text string such as "beginning/cmiddle/rend," where "/" represents an escape sequence initiation character, and the "c" and "r" represent escape sequences for centering and right alignment respectively.

SUMMARY OF THE INVENTION

The present invention includes a method of displaying multiple objects on a display terminal wherein each of the objects is positioned by referenced to a previous object. The previously positioned object is referred to as the anchor object The object being positioned relative to the anchor object is called the aligned object. The position of the aligned object relative to the anchor object is specified by two alignment points, one on the aligned object and one on the anchor object, and the directed distance between those two points.

In the present invention, a limited number of predetermined alignment points are defined for each object. In the present invention, a preferred set of alignment points includes three points horizontally, including right, centered and left, and four points vertically, including bottom, center, top, and a baseline point corresponding with the baseline of the first line of text within the rectangle. A set of flags is used to define the particular relationship between each anchor object and a following aligned object. The specification of each object's position requires four flags indicating the horizontal and vertical alignment points on the anchor and aligned objects, and an optional offset value indicating the horizontal and vertical components of an offset distance between the two specified alignment points. Thus, the specification of relative position is separated from the specification of the text or graphic object to be displayed.

An extension of this invention allows an aligned object to specify two or more anchor objects and associated alignment points and alignment offsets. The aligned object is then "stretched" so that all the alignment conditions are satisfied.

The present invention frees the programmer who must display of the text objects before specifying their position. This is especially helpful when proportional fonts are used, since the length of a text string is not simply based on the number of characters on a string. The present invention allows the location of a series proportionally-spaced, multiple font text strings to be specified as easily as that of mono-spaced, single-font text strings.

The present invention also does not require a priori knowledge of the content of text strings before their position can be specified. This allows text strings to be changed or translated to another language without re specifying their position. In a similar manner, text fonts may be changed by a user, independent of the text being displayed. By realigning the objects after each font change, the positions of the objects automatically adjust to the size changed cause by the font changes. This is especially important for programs which run on systems which have the capability to support a large number of different text fonts. The text fonts available may differ depending on the particular systems on which a program is running. The present invention allows a program to specify the placement of different objects independent of the text font chosen, thus allowing changes of text fonts on an operating system level which are transparent to an application program.

DESCRIPTION OF THE DRAWINGS

The above described advantages and operation of the present invention will be more fully understood upon reading the following description of the preferred embodiment in conjunction with the drawings, of which.

DESCRIPTION OF THE PREFERRED EMBODIMENT

Figure 1:
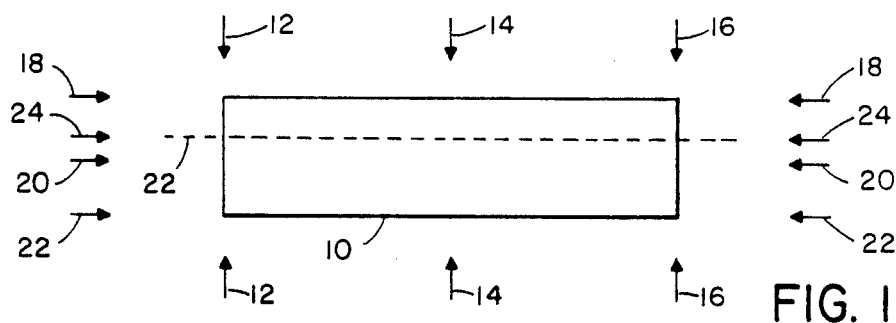
FIG. 1 illustrates the horizontal and verticle locations which define alignment points.

Referring to FIG. 1 there is shown an "alignment rectangle" 10 which represents the horizontal and vertical boundaries of an object to be displayed on a computer display terminal. The object may include text, graphics, or a combination thereof. The alignment rectangle 10 encloses the text or object to be displayed.

For each object, a predetermined number of alignment points are defined for the vertical and the horizontal directions. In the embodiment described herein, three locations are defined along the horizontal direction and four locations are defined along the vertical direction. The horizontal alignment locations are located at the left edge, center, and right edge of the object s alignment rectangle, corresponding to the positions denoted by arrows 12, 14 and 16 in FIG. 1. Similarly, three alignment locations are defined in the vertical direction corresponding to the top, center, and bottom of rectangle 10, as shown by arrows 18, 20, and 22.

Figure 2:
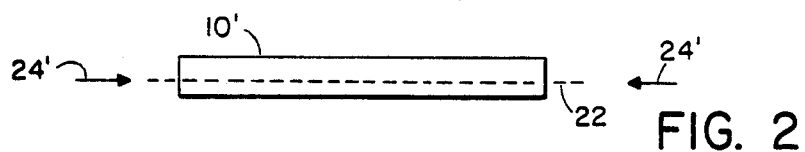
FIG. 2 shows the base line alignment point for an object containing a single line of text.

A fourth alignment location has been found useful in the vertical direction. In the preferred embodiment, a base line location is defined in the vertical direction which corresponds with the base line of the first line of text within the rectangle. In FIG. 1, dotted line 22 represents the base line of the first line of text within rectangle 10 and arrow 24 denote the base line anchor point. The rectangle 10 and base line 24 shown in FIG. 1 are for a rectangle which could include more than one line of text. FIG. 2 shows an alternate rectangle 10 which can contain only one line of text whose base line 22 is denoted by arrows 24'. The location of the base line anchor point varies as a function of the size of the type which is currently being used. As will be described in more detail below, this base line anchor point may change for a particular rectangle as different font sizes are chosen.

Figure 3:
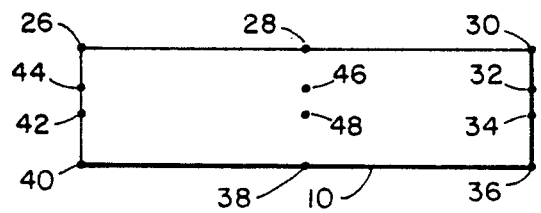
FIG. 3 shows the alignment points for a generalized object.

Referring to FIG. 3, rectangle 10 is shown with each of the possible alignment points which result from the alignment locations illustrated in FIG. 1 identified by dots 26 44. Thus, the top-left alignment point is indicated by dot 26, the right center alignment point is indicated by dot 34, and so on. Dot 46 indicates the base-line-center point, and dot 48 indicates the center-center point.

The alignment point of an anchor object is specified by two flags, one denoting the abscissa or horizontal location of the point on the object and the other indicating the ordinate or vertical location of the point on the object. Similarly, the anchor point on the aligned object is specified by two flags denoting the abscissa and ordinate anchor locations. The location of an aligned object relative to its anchor object is specified by an alignment point on the anchor object and an alignment point on the aligned object, with an optional offset designation. The objects are then positioned relative to one another by locating the two objects such that the alignment points coincide, if the offset is zero, or displaced by the offset amount.

The alignment flags are defined using an orthogonal set of bits so that they may be combined in any order by a logical OR operation. The three possible horizontal locations and four possible vertical locations for the alignment points on an object may be specified using two bits for each direction. Thus, the alignment points on an anchor object and an aligned object may be specified using 8 bits or 1 byte.

Figure 4:
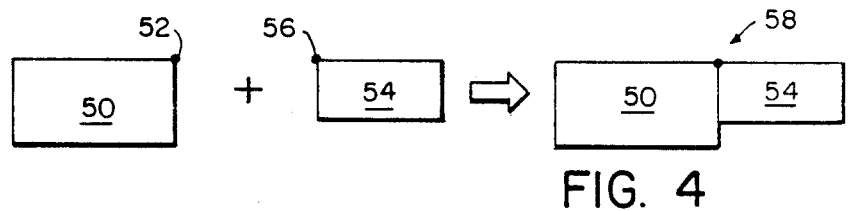
FIGS. 4 and 5 illustrate the use of alignment points to position two objects with respect to one another.
Figure 5:
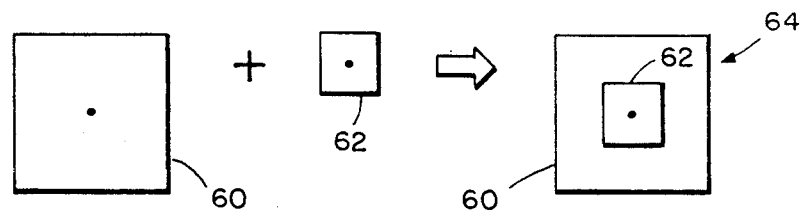

This is illustrated in FIGS. 4 and 5. In FIG. 4 the anchor object is rectangle 50 and the alignment point 52 is the top right point. The aligned object is represented by rectangle 54 whose alignment point is the top left, represented by dot 56. The result of these two specifications is the configuration shown by boxes 58 in FIG. 4. Similarly, in FIG. 5, a first object 60 and second object 62 both have the center center alignment point designated. The resulting configuration is shown at 64, and has object 62 centered within object 60.

Figure 6:
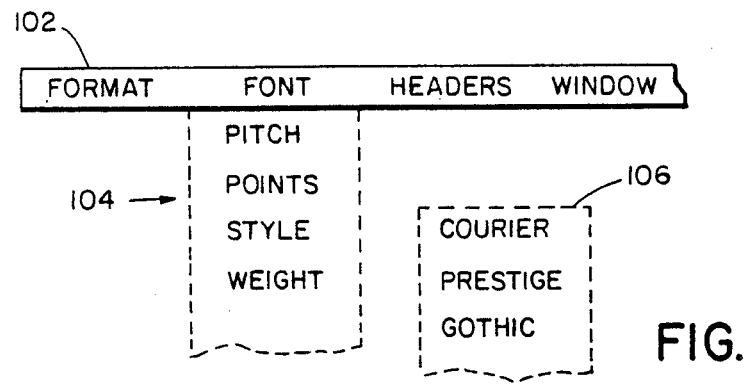
FIGS. 6 and 7 illustrate how the present invention would be used to display a typical word processing selection menu to a user.

FIG. 6 shows a typical display which illustrates some of the advantages of the present invention. In FIG. 6, a horizontal bar 102 has several choices which might be presented to a user of a word processing program. As shown in the figure, these choices allow a user to select FORMAT, FONT, HEADERS, and WINDOW functions. This is typical of a menu bar which might be displayed by a program. A user selects one of the choices by moving a cursor or pointer on the display to the desired function and then selecting the function, such as by pressing a mouse button.

Typically, the selection of a function will result in the presentation of a menu from which choices may be made, the choices possibly involving sub-menus, depending upon the particular function chosen. Continuing on with the example shown in FIG. 6, a user who selects the font function might be presented with a menu as illustrated at 104, which would allow a user to specify various aspects of a selected font. In FIG. 6, a pull-down menu 104 allows the user to select the pitch, points, style, weight, and possibly other attributes of a font. Each of these attributes has a plurality of choices which is displayed on a sub-menu in response to selection of the attribute. For example, if a user selects the style attribute from the font menu, a sub-menu 106 might be displayed which would allow the user to select a particular type style.

Figure 7:
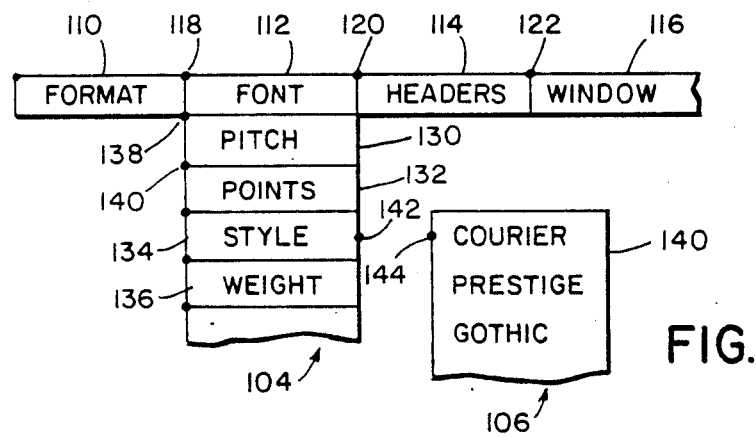

FIG. 7 shows the manner in which the present invention would be used to create the display shown in FIG. 6, and is helpful in illustrating the advantages of the present invention. In FIG. 7, each of the choices in menu bar 102 is contained within its own alignment rectangle. Thus, the format choice is associated with the an alignment rectangle 110, the font choice is associated with an alignment rectangle 112, and so on.

The rectangles for sub-menu 102 are positioned on the screen in the following manner. The format rectangle is the first anchor, and is positioned with respect to a fixed object such as the screen border or the border of a window containing the application. The font rectangle 112 is an aligned object which is positioned with respect to its anchor object, which is format rectangle 110. The top right alignment point of the format rectangle 110 is aligned with the top-left anchor point of the font rectangle 112, as shown by dot 118.

The headers rectangle 114 is then positioned with respect to font rectangle 112. The font rectangle 112 is the anchor object, and the header rectangle 114 is the aligned object. The alignment points are respectively top right and top left, with the result that the headers selection follows the font selection. Similarly, the window rectangle 116, and the rectangles associated with any following menu choices, are positioned following the header's rectangle 114.

After a user has selected the font command in box 112, pull down menu 104 is displayed. In FIG. 7, the elements of the pull down menu are each displayed by means of a separate alignment rectangle. Thus, the pitch function is displayed in rectangle 130, the points rectangle is displayed in rectangle 132, and so forth. The pitch rectangle is located with respect to font rectangle 112 as the anchor object. The alignment points are bottom-left for the font rectangle and top-left for the pitch rectangle as shown at point 138. Next, the points rectangle 132 is positioned with respect to the pitch rectangle 130 by aligning the bottom-left and top-left alignment points respectively, as shown by dot 140. The style and weight rectangles 134 and 136 are located following points rectangle 132 in a similar manner.

In response to a user selecting the style function shown in rectangle 134, sub-menu 106 is displayed. In FIG. 7, sub-menu 106 is shown as a single box 140 which includes multiple text lines denoting the available style selections. Rectangle 140 is positioned by using the style rectangle 134 as an anchor and aligning the right baseline alignment point 142 of style rectangle 134 with the left-baseline alignment point for style selection rectangle 140 with a positive horizontal offset. This is shown in FIG. 7.

It should be appreciated that the display of the different style selections sub-menu 106 could be achieved by mean of individual rectangles for each of the style selections. The particular method used will depend on the application. For example, styles may come in predefined sets corresponding with the type faces available on a particular printer. In this case, it may be more efficient to have each set of styles in a single sub-menu rectangle which can be positioned all at once. On the other hand, if a printer which has individually loadable type fonts is being used, sub-menu 106 would probably be better displayed using individual rectangles for each individual type face. The placement of the first alignment rectangle for sub-menu 106 is done in the same manner, regardless of whether the type styles are implemented as individual rectangles or in a single rectangle. In either case, the left base line alignment point of the first box is used.

While the method described above to present the display of FIG. 6 may seem overly cumbersome, it has significant advantages not provided by prior art methods. For example, choices may be added to or deleted from the font sub-menu 104 without having to alter the manner in which each of the choices is located in the display. The letter size used for the display for the menu selections may be varied resulting in larger rectangles without having to implement a new positioning algorithm. Translating the selections to a different language may well result in longer or shorter text lengths to describe the different selections. By using the method of the present invention, an applications program needs only to change the text designating the different selections. The same alignment designations are used, and the same relative positioning results, although the absolute position of the different selections on the display may change as a result of the different text lengths. Thus, for example, changing the menu system shown in FIG. 6 from English to German, which might require the use of words having many more letters, may be done by merely changing the description text. The applications program does not need to recalculate o otherwise take into account the relative positions of each menu selection.

The ability to change descriptive phrases without having to take into account the different length of different descriptions is advantageous in customizing a particular program or system to the preferences of a user. For example, a function referred to as "block move" by some users may be more easily recognized as a "cut and paste" function to other users. The present invention allows a user to customize a menu without destroying the alignments of the various menu elements on a display. Another capability which is enhanced by the present invention is the arrangement of menu selections in a particular order. As programs become more powerful and the number of options available increases, the selection of options can become tedious. The present invention may be used to allow a user to arrange menu elements in a particular order suited to individual requirements in order to alleviate the chore of making particular selections.

For example, using the menu shown in FIGS. 6 and 7, a particular user may select the gothic type style from sub-menu 106 for the majority of his or her work. Menu systems typically are displayed with the first-listed choice being the default choice. The present invention contributes to systems in which menu choices may be reordered to allow a user to position the most frequently used choices at the head of a list of choices.

Figure 8:
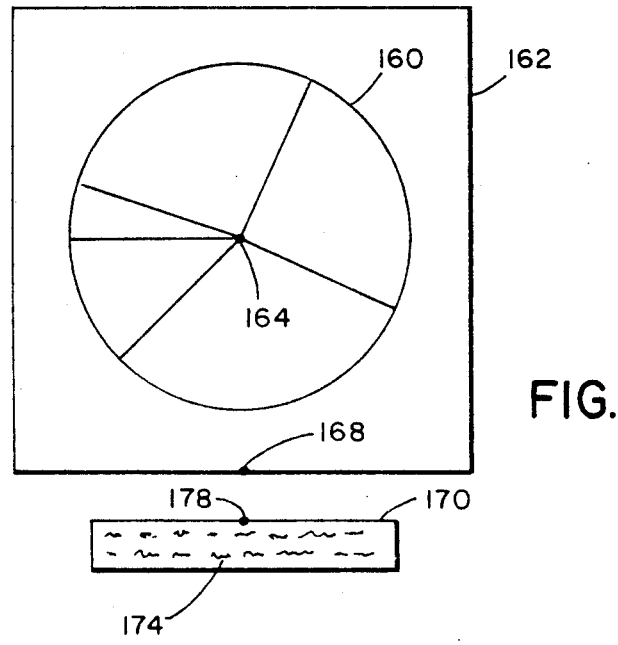
FIG. 8 illustrates how the present invention would be used to align graphical and textual objects with one another.

The present invention makes aligning graphic and textual objects especially easy. Referring to FIG. 8, there is shown a display which includes a pie chart 160 surrounded by a border 162 and identified by a textual legend 174 beneath the chart. In FIG. 8, the pie chart 160 is aligned with border 162 by choosing the center-center alignment points 164 of each object and specifying 0 offset. The legend 174 is then easily aligned with the graph by selecting the bottom-center alignment point 168 of border 162 and the top-center alignment point 17 of the alignment rectangle defining the border of the message 174. A positive vertical offset is selected to position legend 174 beneath the graph.

The particular method of implementing the present invention will vary depending on the particular computer, operating system, and programming languages used. In adapting the teachings of the present invention to different applications, those of ordinary skill in the art will modify the preferred embodiment described herein. Accordingly, the invention should not be limited by the foregoing description of the preferred embodiment, but rather should only be interpreted in accordance with the following claims.

What is claimed is:

1. A method of positioning a first object on a computer display relative to a second object, whose position is fixed, said method including the steps of:
    selecting a first plurality of positions along the horizontal axis of each object to be displayed independent of content of the object;
    selecting a second plurality of positions along the vertical axis of each object to be displayed independent of content of the object;
    defining a plurality of alignment points for each of the objects equal in number to the first plurality times the second plurality and located at the intersections of vertical and horizontal lines going through each of the first and second plurality of positions;
    specifying a first selected one of the alignment points on the first object;
    specifying a second selected one of the alignment points on the second object;
    specifying an offset value having vertical and horizontal components, one or both of which might be zero; and
    positioning the second object so that the second selected alignment point is placed at a location relative to the first alignment point specified by the offset value such that the second object may be positioned at any one of the locations available on the computer display including a location that overlaps the first object.

2. The method of claim 1 wherein the first plurality of positions includes three positions located a the left edge, right edge, and center of the object along its horizontal axis.

3. The method of claim 2 wherein the second plurality of positions includes three positions located at the top edge, bottom edge, and center of the object along its vertical axis.

4. The method of claim 3 further comprising the step of defining an additional position on the vertical axis of the object located at the baseline of the first line of multiple lines of text of the object.

5. The method of claim 1 wherein the second plurality of positions includes three positions located at the top edge, bottom edge, and center of the object along its vertical axis.

6. The method of claim 5 further comprising the step of defining an additional position on the vertical axis of the object located at the baseline of the first line of multiple lines of text of the object.

7. The method of claim 1 further including a method of positioning a third object with respect to the second object, including the steps of:
    selecting said first plurality of positions along the horizontal axis of the third object;
    selecting said second plurality of positions along the vertical axis of the third object;
    defining a plurality of alignment points for the third object equal in number to the first plurality times the second plurality and located at the intersections of vertical and horizontal lines going through each of the first and second plurality of positions;
    specifying a third selected one of the alignment points on the second object;
    specifying a fourth selected one of the alignment points on the third object;
    specifying a second offset value having vertical and horizontal components, one or both of which may be zero; and
    positioning the third object so that the fourth selected alignment point is placed at a location relative to the third alignment point specified by the second offset value.

8. The method of claim 1 further comprising the step of defining an additional position on the vertical axis of the object located at the baseline of the first line of multiple lines of text of the object.

9. The method of claim 1 wherein the steps of specifying the alignment points and offset value are performed by an application program and the step of positioning the second object is performed by an operating system program.

10. The method of claim 1 wherein at least one of the objects is a non-textual graphical object.

11. A method of displaying information in a computer system comprising:
    identifying a first object of multiple characters of text data;

identifying a second object of multiple characters of text data;

identifying a location of the second object relative to the first as one of any of the locations available on the computer system including a location that overlaps the first object, by selecting one of a plurality of alignment points defined relative to the second object, the alignment points being selected independent of the number or size of characters within the object; and by means of the computer system, displaying the first and second objects, with the position of the second object relative to the first object being determined by the selection of alignment points.

12. The method of claim 11 wherein the plurality of alignment points defined relative to each of the first and second objects define edges and at least one point within a rectangular object.

13. The method of claim 12 wherein the plurality of alignment points for each of the objects includes three positions located at the left edge, right edge and center of each object along a horizontal axis.

14. The method of claim 13 wherein the plurality of alignment points for each of the objects includes three positions located at the top edge, bottom edge and center of the object along a vertical axis.

15. The method of claim 14 further comprising the step of defining an additional position for each object on the vertical axis of the object located at the baseline of the first line of multiple lines of text of the object.

16. The method of claim 12 wherein the plurality of alignment points for each of the objects includes three position located at the top edge, bottom edge and center of the object along a vertical axis.

17. The method of claim 12 further comprising the step of defining an additional position for each object on the vertical axis of the object located at the baseline of the first line of multiple lines of text of the object.

18. The method of claim 11 further comprising the step of defining an additional position for each object on the vertical axis of the object located at the baseline of the first line of multiple lines of text of the object.

19. The method of claim 11 wherein the step of identifying a location of the second object comprises specifying an offset between the alignment points on the first and second objects.

20. The method of claim 11 wherein the steps of identifying the objects and locations are performed by an application program and the step of displaying is performed by an operating system program.

21. A method of displaying information in a computer system comprising:

identifying a first object;

identifying a second object wherein at least one of said first and second objects is comprised of non-character graphics;

identifying a location of the second object relative to the first as one of any locations available on the computer system including a location that overlaps the first object by selecting one of a plurality of alignment points defined relative to the first object and one of a plurality of alignment points defined relative to the second object, the alignments points being selected independent of the content of each object; and by means of the computer system, displaying the first and second objects, with the position of the second object relative to the first object being determined by the selection of alignment points.

22. The method of claim 21 further comprising in the step of identifying a location of the second object the step of specifying an offset of the selected alignment points.

23. The method of claim 21 wherein the steps of identifying the objects and locations are performed by an application program and the step of displaying is performed by an operating system program.

24. A method of positioning a first object on a computer display relative to a second object, whose position is fixed, wherein at least one of said first and second objects contains non-character graphics, said method including the steps of:

selecting a first plurality of positions along the horizontal axis of each object to be displayed independent of content of the object;

selecting a second plurality of positions along the vertical axis of each object to be displayed independent of the content of the object including a position located at the baseline of the first line of multiple lines of text of the object;

defining a plurality of alignment points for each of the objects equal in number to the first plurality times, the second plurality and located at the intersections of vertical and horizontal lines going through each of the first and second plurality of positions;

specifying a first selected one of the alignment points on the first object;

specifying a second selected one of the alignment points on the second object;

specifying an offset value having vertical and horizontal components, one or both of which may be zero; and positioning the second object so that the second selected alignment point is placed at a location relative to the first alignment point specified by the offset.

* * * * *